United States Patent [19]

Sun

[11] Patent Number: 5,752,877
[45] Date of Patent: May 19, 1998

[54] POPUP A/C OUTLET

[75] Inventor: Andy Kwan-Leung Sun, North York, Canada

[73] Assignee: Collins & Aikman Plastics, Inc., Troy, Mich.

[21] Appl. No.: 608,608

[22] Filed: Feb. 28, 1996

[51] Int. Cl.[6] ............................................. B60H 1/34
[52] U.S. Cl. ........................ 454/155; 454/307; 454/315; 454/316
[58] Field of Search ................... 454/155, 202, 454/315, 316, 307, 152

[56] References Cited

U.S. PATENT DOCUMENTS

| | | |
|---|---|---|
| 622,375 | 4/1899 | Leather .................... 454/316 |
| 1,751,441 | 3/1930 | Campbell . |
| 1,996,816 | 4/1935 | Kirsch et al. . |
| 2,020,370 | 11/1935 | Moog et al. . |
| 2,070,113 | 2/1937 | Burgess . |
| 2,655,093 | 10/1953 | Broberg . |
| 3,264,971 | 8/1966 | Dangauthier . |
| 3,572,233 | 3/1971 | Bar et al. . |
| 3,861,281 | 1/1975 | Godwin . |
| 3,921,507 | 11/1975 | Condet et la. .................... 454/155 |
| 4,610,196 | 9/1986 | Kern . |
| 4,633,770 | 1/1987 | Taylor et al. .................... 454/316 X |
| 4,653,386 | 3/1987 | Hayakawa et al. . |
| 4,665,804 | 5/1987 | Miyasaka . |
| 4,702,155 | 10/1987 | Hildebrand et al. . |
| 4,938,122 | 7/1990 | Ziemba . |
| 5,188,561 | 2/1993 | Nissimoff et al. . |

FOREIGN PATENT DOCUMENTS

| | | | |
|---|---|---|---|
| 0 195 344 | 9/1986 | European Pat. Off. | ............... 454/155 |
| 35 09 537 | 9/1986 | Germany | ............... 454/155 |

*Primary Examiner*—Harold Joyce
*Attorney, Agent, or Firm*—Bliss McGlynn, P.C.

[57] ABSTRACT

An outlet nozzle assembly (10) includes a pivotal cover (20) which lies flush with the mounting structure (12) in the closed position and which pivots at one end (22) to be outwardly angled with respect to the mounting structure (12) in the open position exposing the outlet housing (18). The amount of opening may be manipulated through a ratchet mechanism (54). The cover (20) allows the outlet housing (18) to be invisible within the mounting structure (12) during non-use.

13 Claims, 5 Drawing Sheets

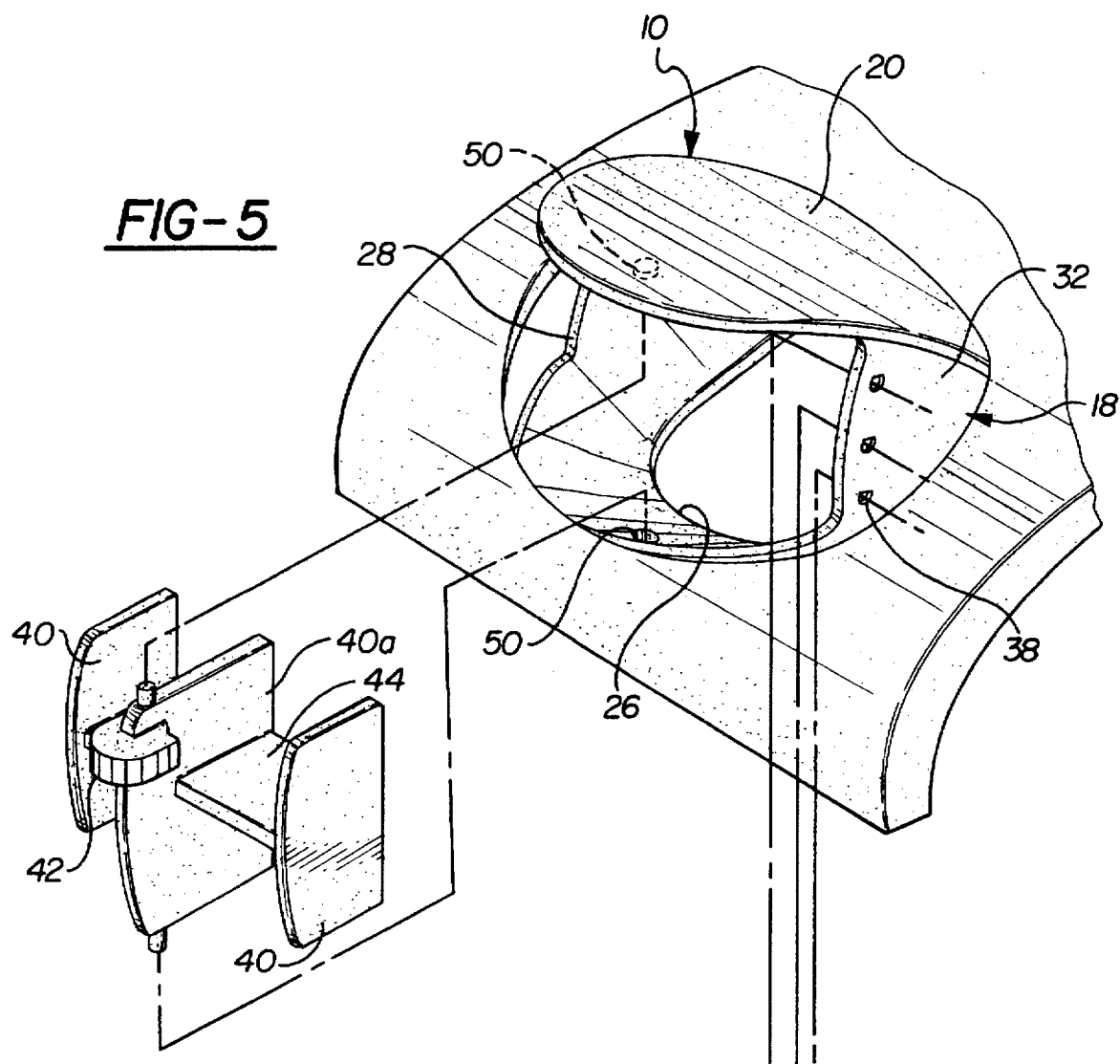
FIG-5
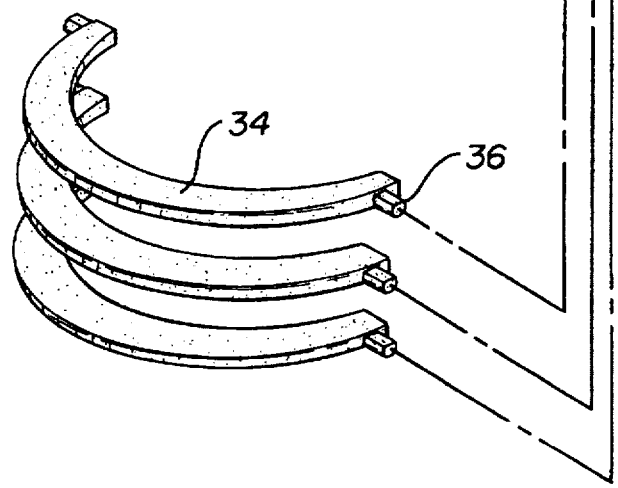

POPUP A/C OUTLET

BACKGROUND OF THE INVENTION

1. Field of the Invention

The present invention relates generally to ventilating or air outlet nozzles for use in directing air, and more particularly toward air outlet nozzles used in vehicles for heating and cooling the passenger compartment.

2. Description of the Related Art

Ventilating nozzles are commonly used in a variety of applications to allow control of air through the outlet. Such ventilating systems allow a user to direct air in various directions, and also allow control of the volume or amount of air passing through the outlet. Some such ventilating nozzles allow opening and closing of the outlet nozzle by a cover or internal valving therein.

U.S. Pat. No. 1,751,441 issued Mar. 18, 1930 in the name of Campbell and U.S. Pat. No. 2,655,093 issued Oct. 13, 1953 in the name of Broberg, both disclose valve or grill designs which include a cover over the outlet to close and open the outlet. However, with these designs, air direction cannot be easily manipulated.

U.S. Pat. No. 5,188,561 issued Feb. 23, 1993 in the name of Nissimoff et al. discloses a cover which can close an air conditioning grill. Furthermore, the vanes may be pivoted in the up and down direction. The cover merely slides over the vanes on a housing stationary.

U.S. Pat. No. 2,020,370 issued Nov. 19, 1935 in the name of Moog et al. discloses a closure element which pivots at a central point to close and open the outlet. The closure element is a plate like member. U.S. Pat. No. 4,610,196 issued Sep. 9, 1986 in the name of Kern, U.S. Pat. No. 3,264,971 issued Aug. 9, 1966 in the name of Dangauthier, and U.S. Pat. No. 1,996,816 issued Apr. 9, 1935 in the name of Kirsch et al., all disclose deflectors which may pivot out of an opening to direct air. However, there is no method of closure in such designs.

SUMMARY OF THE INVENTION

The invention is an air outlet assembly for placement in a support having a outer surface extending about a support opening. The assembly comprises an outlet housing pivotally connected to the support at the support opening for moving between a closed position and an open position. A cover is included and secured to the outlet housing extending substantially flush with the outer surface and covering the support opening in the closed position. The cover moves away from the support opening in the open position to allow air to pass therethrough.

Also included is an outlet assembly wherein the outlet housing includes vanes secured across the air outlet to direct air. A pivot mechanism is attached between the outlet housing and the support allowing the air outlet to pivot with respect to the support between a closed position with the cover over the support opening and the open position with the housing and vanes extending out of the support.

Also included is a method of operating an outlet assembly including the step of providing an outlet housing having the air inlet and the air outlet pivotally connected in the support and the cover secured to the housing. Also included is the step of pivoting the cover between the closed position with the cover substantially flush with the support preventing air from flowing out the air outlet and the open position with the cover moved to provide an opening allowing air to flow out the air outlet.

BRIEF DESCRIPTION OF THE DRAWINGS

Advantages of the subject invention will be readily appreciated as the same becomes better understood by reference to the following detailed description when considered with the accompanying drawings wherein:

FIG. 5 is an exploded view of the housing, vanes and louvers; and

DESCRIPTION OF THE PREFERRED EMBODIMENT

Figure 1:
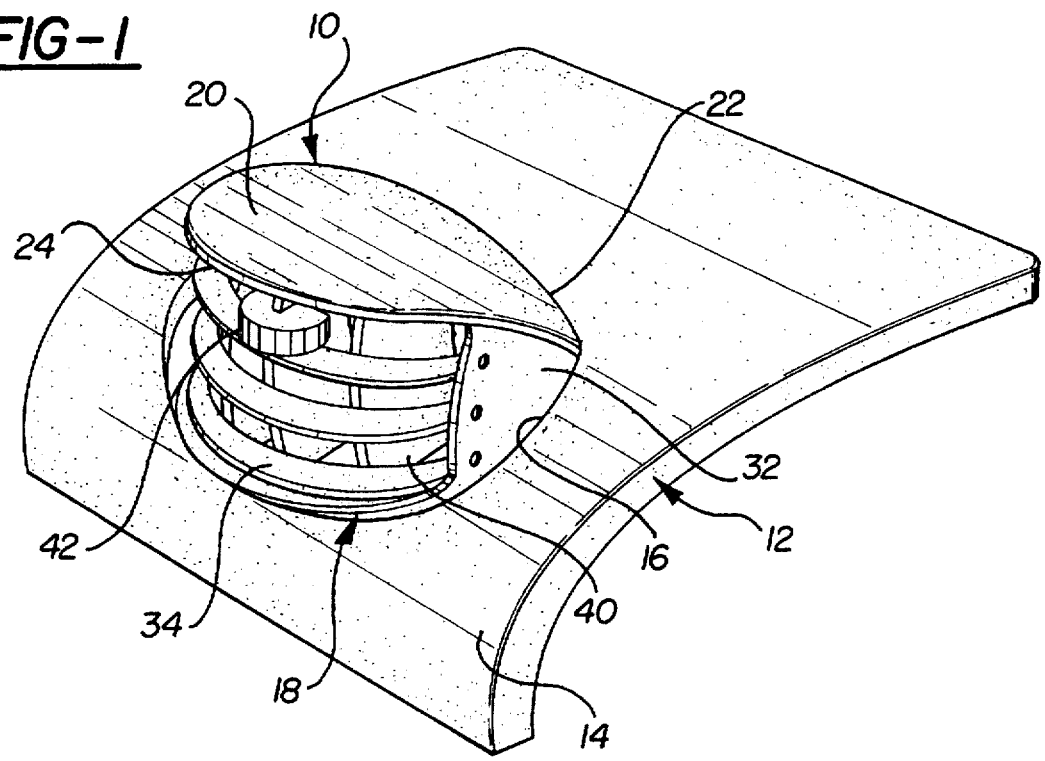
FIG. 1 is a perspective view of the outlet assembly in the open position.
Figure 2:
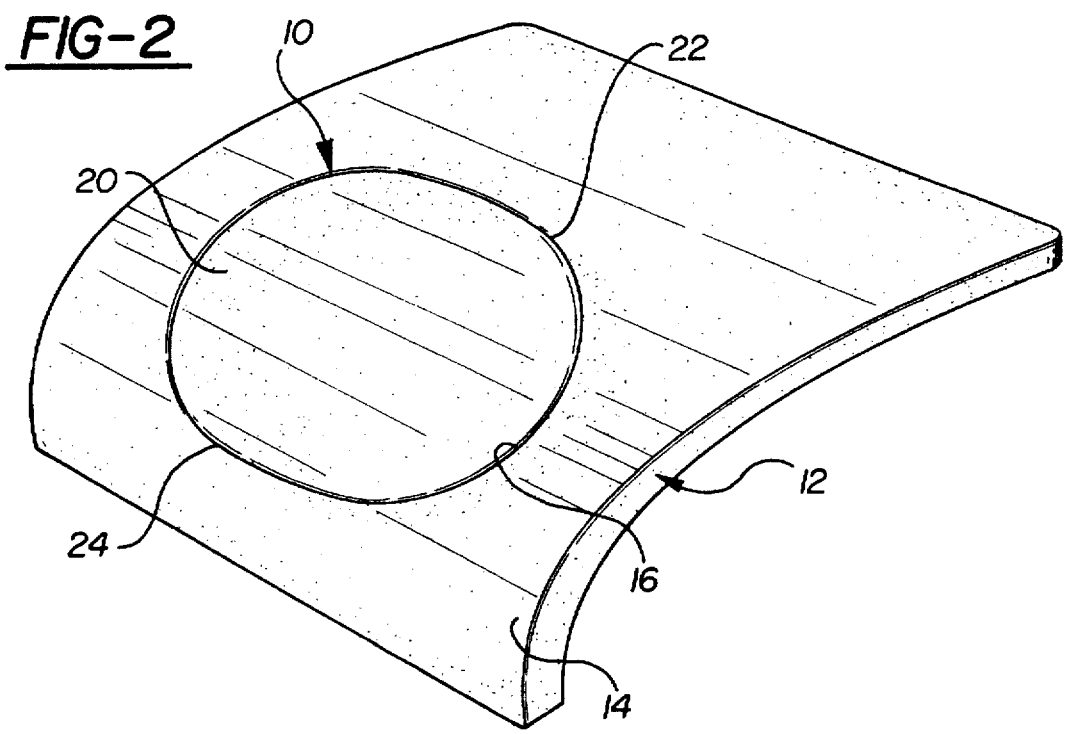
FIG. 2 is a perspective view of the outlet assembly in the closed position.
Figure 3:
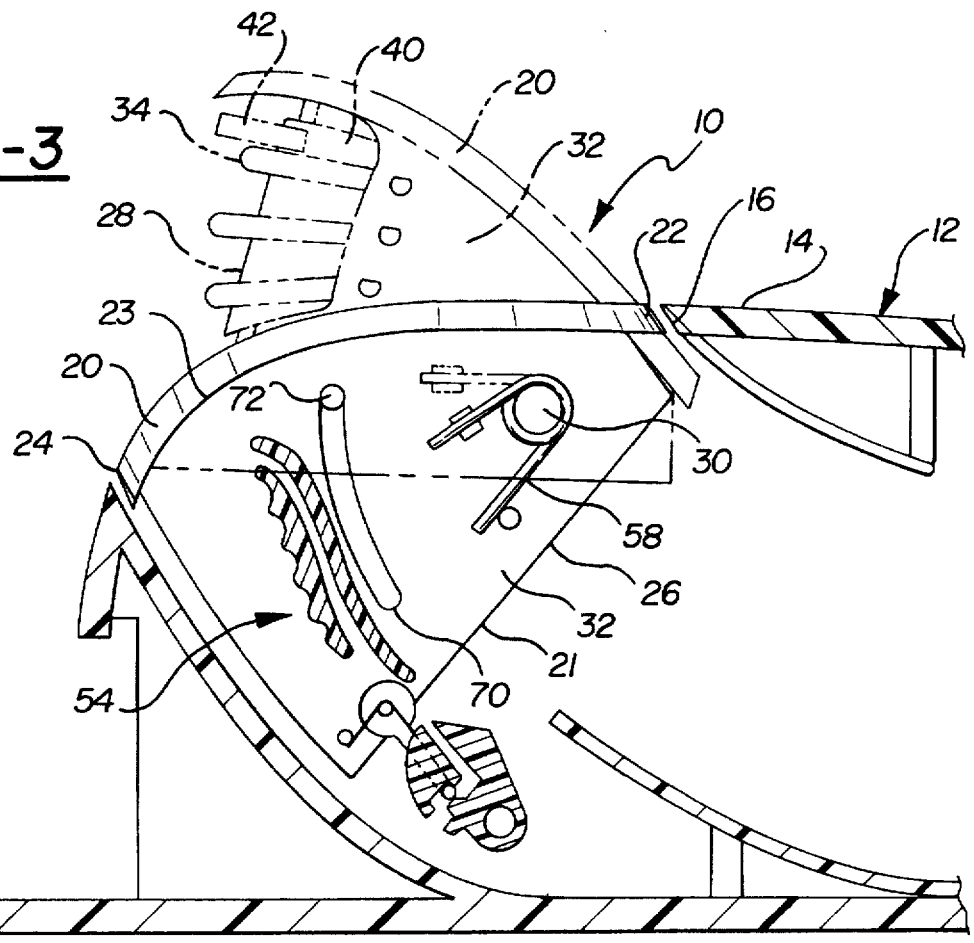
FIG. 3 is a partially cut away view of the outlet assembly in the closed position with phantom lines indicating the outlet assembly in the open position.

An air outlet assembly 10 for placement in a support 12 is generally shown in the Figures. The support 12 has an outer surface 14 extending about a support opening 16 which receives the outlet assembly 10. The outlet assembly 10 may be typically mounted in a vehicle, or may be used in other embodiments as can be appreciated by the teachings of the invention. In the preferred embodiment, the outlet assembly 10 is mounted in a support 12 forming a part of the vehicle interior, such as an instrument panel, roof space, on support pillars, etc. Furthermore, the outlet assembly 10 may be located to move in the upward direction as shown in FIGS. 1 and 2; however, it may be also positioned upsidedown or sideways, as desired, to pop out of the support 12.

The outlet assembly 10 includes an outlet housing 18 pivotally connected to the support 12 adjacent the support opening 16 for moving between a closed position and an open position. A cover 20 is secured to the outlet housing 18 and extends substantially flush with the outer surface 14 of the support 12 covering the support opening 16 in the closed position. The cover 20 is shown in the open position in FIG. 1 and in the closed position in FIG. 2. In the open position, the cover 20 allows air to pass through the support 12 and the assembly 10, whereas in the closed position air is prevented from passing through the support 12 and assembly 10.

The outlet housing 18 includes first and second ends 22,24. The first end 22 is pivotally connected to the support 12 and the second end 24 moves during positioning between the closed position adjacent the support 12 and the open position with the second end 24 spaced away from the outer surface 14. The outlet housing 18 also includes an air inlet 26 opposing the cover 20 and located within the support 12, and an air outlet 28 adjacent the cover 20 in the open position allowing air to flow out of the support 12. The air inlet 26 receives pressurized air from within the support 12, such as from a vehicle fan, and transfers the air through the outlet housing 18 to the air outlet 28.

The outlet housing 18 is generally of a clam shape design having an open base 21 providing the air inlet 26 and an upper clam side 23 attached to and/or providing the cover 20 with the air outlet 28 at the clam open side between the base 21 and cover 20 of the clam shape. The cover 20 is fixedly connected to the outlet housing 18 or is formed as a part thereof. The outlet housing 18 is connected by pivot pins 30

(one shown) such that the first end 22 pivots about the pivot pins 30. In the closed position, the cover.20 lies flush with the outer surface 14 of the support 12. The first end 22 remains adjacent the outer surface 14 of the support 12 in both the open and closed positions, whereas the second end 24 of the outlet housing 18 pivots between the closed position with the cover 20 flush with the outer surface 14 and the open position with the cover 20 pivoted away from the support opening 16 and the outer surface 14 with the second end 24 spaced from the surface 14. The outlet housing pivots approximately through 450°. The support 12 includes an arcuate guide slot 70 on each side of the assembly 10 to be engaged by a respective guide pin 72 extending from side walls 32 of the outlet housing 18.

The cover 20 comprises a generally circular or oval shaped sheet of contour to follow the outer surface 14, which also is the shape of the outlet housing 18 in a plan view. The outlet housing 18 includes parallel side walls 32 which extend between the cover 20 and base 21 from the first end 22 toward the second end 24 or approximately ⅔ of the way.

A plurality of vanes 34 extend across the outlet housing and are connected to the side walls 32. In the preferred embodiment, three vanes 34 are fixedly secured to the side walls 32 of the outlet housing 18. The vanes 34 are generally arcuate in shape to compliment the contour of the cover 20 and outlet housing 18 at the second end, and include rectangular pins 36 at the ends thereof to engage apertures 38 in the side walls 32. In the preferred embodiment, the vanes 34 are fixedly connected and are non-moveable with respect to the outlet housing 18 by use of rectangular pins 36 and apertures 38. However, it is to be understood that the vanes 34 may be molded integrally with the outlet housing 18.

Figure 4:
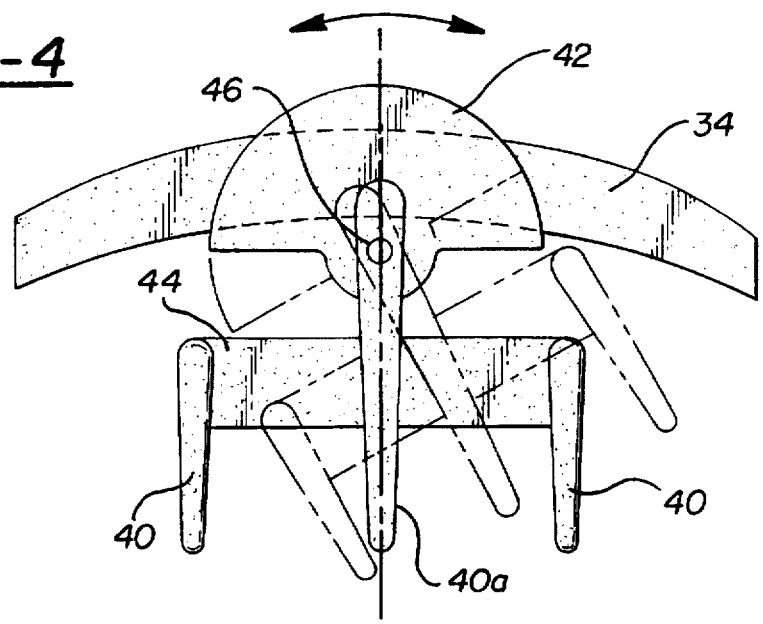
FIG. 4 is a plan view illustrating the vanes and louver positioning.

Also included are moveable louvers 40 extending between the cover 20 and the base 21 of the outlet housing 18. In the preferred embodiment, included are three louvers 40 with a center louver 40a pivotally connected between the cover 20 and base 21. Extending outwardly from the center louver 48 is a knob 42 which extends outwardly from and between the vanes 34 to allow a user to pivot the louvers 40 into a desired position. In the preferred embodiment the knob 42 is located between the cover 20 and upper most vane 34. The outer louvers 40 are connected to the center louver 40a by a center bar 44 connected and extending through each of the louvers 40. It is best illustrated in FIGS. 4 and 5, the center louver 40a includes pins 46 extending from both upper and lower ends thereof which are received within recess 50 in the cover 20 and the base 21.

It can be appreciated that the outlet housing 18 may include the cover 20 as an integral member or the cover 20 may be separately applied to the outlet housing 18 with a pop formed on the outlet housing 18.

The assembly 10 also includes torsional springs 58 operatively connected between the outlet housing 18 and the support 12 for biasing the outlet housing 18 to the open position. The spring 58 may be secured about the pivot pin 30.

The outlet assembly 10 also includes a ratchet mechanism 54 operatively connected between the outlet housing 18 and the support 12 for allowing selective positioning of the outlet housing 18 at a plurality of positions between the open and closed positions to adjust air flow through the air outlet 28. The ratchet mechanism 54 is best illustrated in the FIGS. 3 and 6A–6F. The ratchet mechanism 54 includes a pawl 56 biased by a torsional spring 57 which engages a generally longitudinal ratchet bar 58. The ratchet bar 58 has a smooth contoured rear side 60 spaced from a complementary contoured channel member 62. The spaced rear side 60 and channel member 62 provide a guide channel 64 through which the spring biased pawl 56 may move. The spring 57 biases the pawl 56 outwardly, i.e. in the horizontal direction in relation to the Figures. The channel member 62 includes an arcuate lip 63 which over hangs the top of the ratchet bar 58 to guide the pawl 56 against the ratchet side 61.

Furthermore, a latch 66 is included to maintain the outlet housing 18 in its closed position. The latch 66 includes a maze channel 67 having two release positions or channels A,B. The first release position A catches or latches the pawl 56 in a locked position in the latch 66 upon first full depression of the assembly 10 into the support 12. The second release position B allows the pawl 56 to be fully released by the latch 66 and travel through and outwardly of the channel 67.

In an alternative embodiment, the ratchet mechanism 54' may be formed by an integral ratchet bar 58', channel member 62', and latch 66'. (FIG. 6B)

Figure 6A:
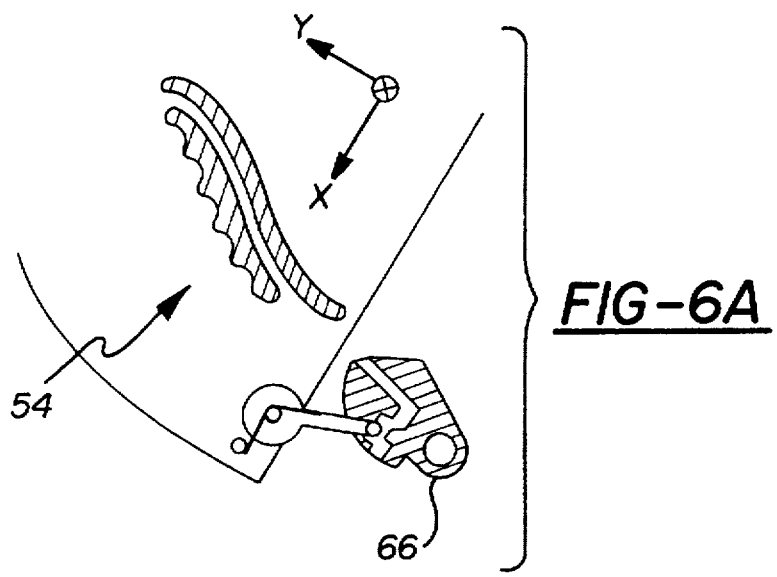
FIGS. 6A–6F are schematic diagrams of the ratchet mechanism.
Figure 6B:
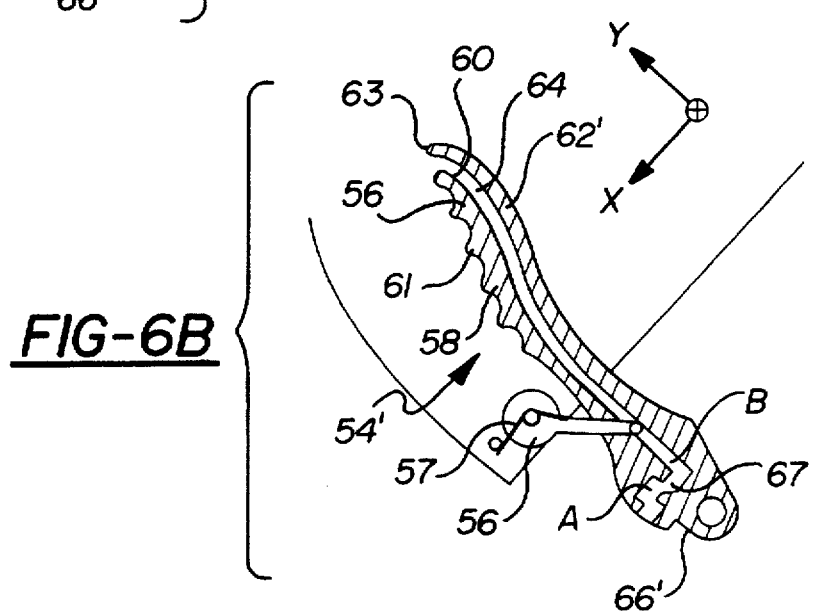
Figure 6C:
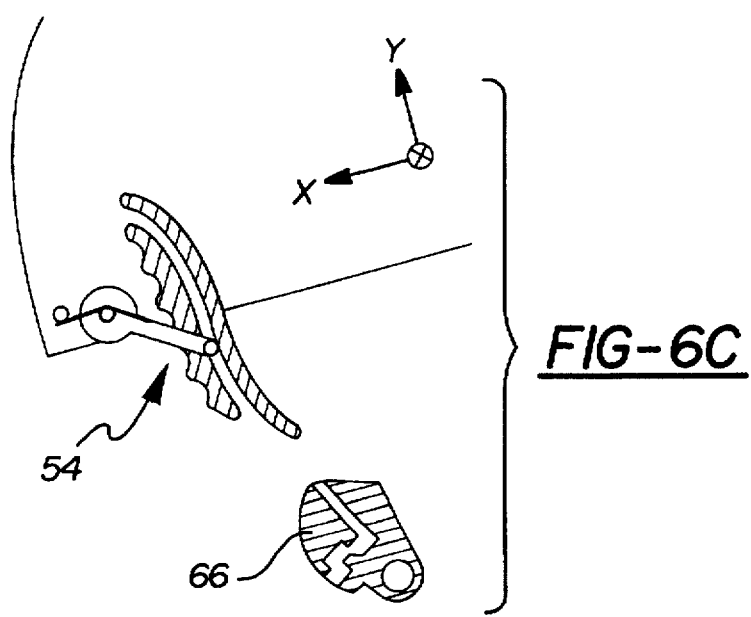
Figure 6D:
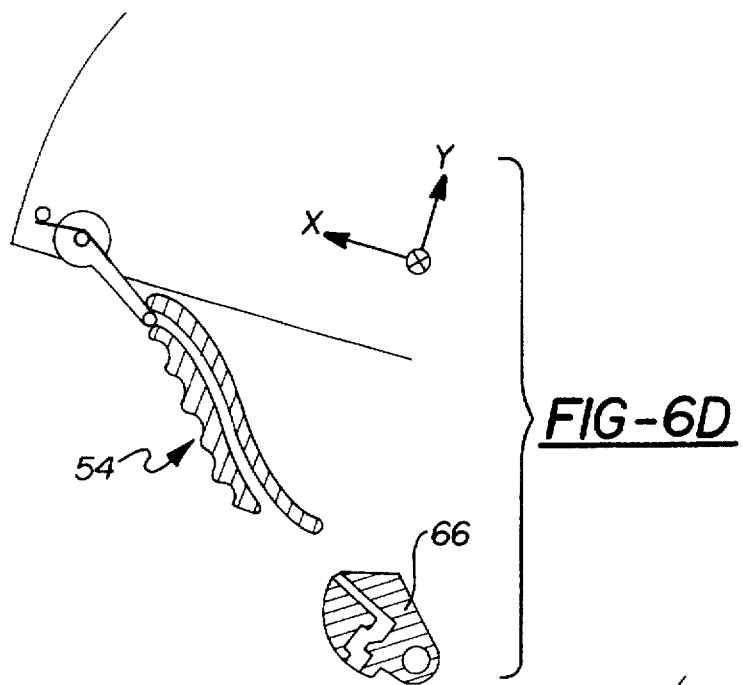
Figure 6E:
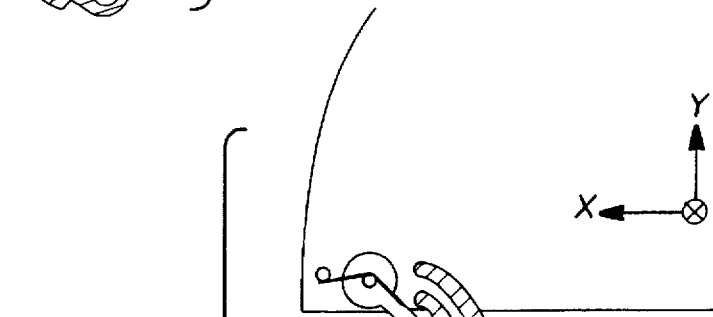
Figure 6F:
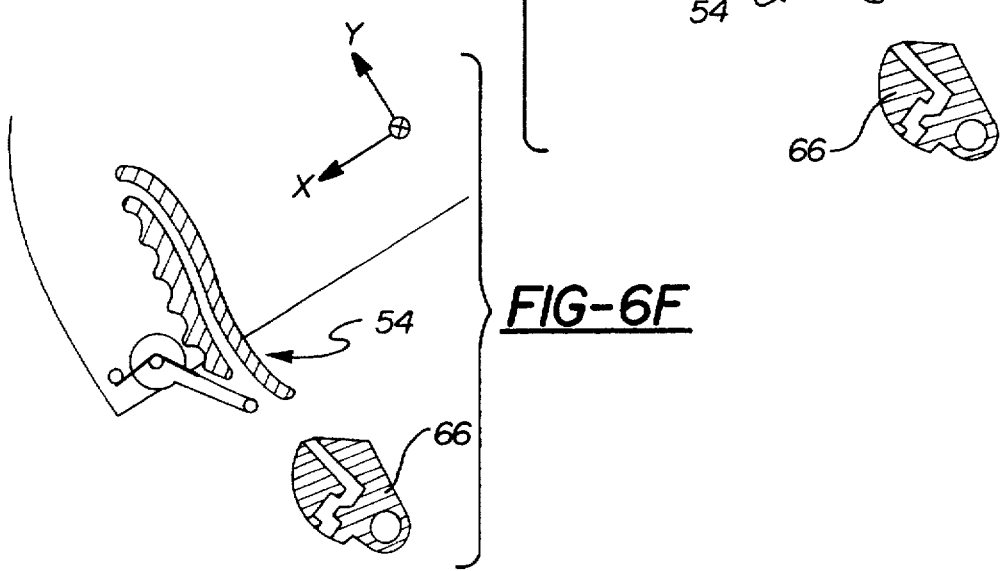

The operation can be best understood by reference to FIGS. 6A–6F. In the closed and latched position, the pawl 56 is engaged within the latch 66 (FIG. 6A). Upon depression of the cover 20, the latch 66 releases the pawl 56 and allows the outlet housing 18 to be biased toward its open position (FIG. 6B). As the outlet housing 18 moves toward the open position, the pawl 56 slides within the channel 64 to the fully opened position (FIG. 6D). The lip 63 forces the pawl 56 out of the channel 64 (FIG. 6D), so that depression of the cover 20 downwardly allows the pawl 56 to engage the ratchet side (FIG. 6E). The user may then position the outlet housing 18 to various position by manually pressing down or pulling up the outlet housing 18. In this operation, the pawl 56 engages the ratchet 58 to allow positioning of the outlet housing 18. When the user is to close the outlet housing 18, the outlet housing 18 is fully pressed into the support 12 which causes the pawl 56 to again engage the latch 66.

Alternatively, the ratchet mechanism 54 may be altered to ratchet out of the closed position one step at a time as controlled by the user, and to allow retraction from full open to close without ratcheting. In other words, the ratchet bar 58 and channel member 62 may be flipped so that the ratchet is on the right (relative to the Figures) and the smooth channel 67 in the left. Upon latch release, the pawl 56 engages the ratchet. Once fully open, the pawl disengages the ratchet and will enter the channel 67 upon depressing the cover 20.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An air outlet for placement in a support having an outer surface defining a curved surface extending about a support opening, said air outlet comprising:

an outlet housing pivotally connected to the support at the support opening for moving between a closed position and an open position;

a cover having a curved toy surface extending through the curved surface of the outer surface of the support, said cover secured to said outlet housing extending substantially flush with the outer surface and covering the support opening in the closed position, said cover providing a continuous, uninterrupted extension over said support opening such that the outer surface is substantially continuous through said cover when said outlet housing is in said closed position to provide an appearance of continuity of the outer surface without interruption except for said support opening.

2. An assembly as set forth in claim 1 wherein said outlet housing includes a first and second ends, said first end pivotally connected to the support and said second end moving between said closed position and said open position with said second end spaced away from the outer surface.

3. An assembly as set forth in claim 2 wherein said outlet housing includes an air inlet opposing said cover with the support and an air outlet at said second end in said open position allowing air to flow out of the support.

4. An assembly as set forth in claim 3 wherein said air outlet of said housing includes vanes extending thereacross to direct air, said vanes pivoting with said housing.

5. An assembly as set forth in claim 4 wherein said air outlet of said housing includes louvers pivotally connected to said housing for selectively directing air to a plurality of directions.

6. An assembly as set forth in claim 5 wherein said vanes are fixedly and non-movably connected to said housing adjacent said air outlet.

7. An assembly as set forth in claim 3 further including a ratcheting mechanism operatively connected between said housing and the support for allowing selective positioning of said housing at a plurality of positions between said open and closed positions to adjust air flow through said air outlet.

8. An assembly as set forth in claim 7 further including a spring operatively connected between said housing and the support for biasing said housing to said open position.

9. A method of making an outlet assembly including the steps of:

providing an outlet housing having an air inlet and an air outlet pivotally connected in a support opening of a support and a cover secured to the housing;

pivotally connecting the outlet housing to a support to allow the cover to pivot between a closed position with the cover substantially flush with the support preventing air from flowing out the air outlet and an open position with the cover moved to provide an opening allowing air to flow out the air outlet;

latching the cover within the support in the closed position to allow release of the cover upon depression of the cover so that the external surface of the cover and support provide a continuous and uninterrupted surface at the outlet assembly except for the support opening.

10. A method as set forth in claim 9 further including selectively positioning the cover to a plurality of intermediate positions between the closed and open positions.

11. An air outlet for placement in a support having an outer surface extending about a support opening, said air outlet comprising:

an outlet housing pivotally connected to the support at the support opening for moving between a closed position and an open position;

a cover secured to said outlet housing extending substantially flush with the outer surface and covering the support opening in the closed position, said cover providing a continuous, uninterrupted extension over said support opening such that the outer surface is substantially continuous through said cover when said outlet housing is in said closed position to provide an appearance of continuity of the outer surface without interruption except for said support, opening; and a releasable latch operatively connected to said cover and within said support so as not to interrupt the outer surface and cover.

12. An air outlet for placement in a support having an outer surface extending about a support opening, said assembly comprising:

an outlet housing pivotally connected to the support at the support opening for moving between a closed position and an open position;

a cover secured to said outlet housing extending substantially flush with the outer surface and covering the support opening in the closed position;

a ratchet mechanism operatively connected between said housing and the support for allowing selective positioning of said housing at a plurality of positions between said open and closed positions, said ratchet mechanism includes a first channel for allowing unratcheted movement from one of said open and closed positions and a second channel for allowing ratchet movement from the other of said open and closed positions.

13. An outlet as set forth in claim 12 wherein said first channel is operatively connected at one of said open and closed positions and said second channel is operatively connected at the other of said open and closed positions so that one of said first and second channels is utilized from the fully open position and the other of said first and second channels is utilized from the fully closed position.

\* \* \* \* \*

UNITED STATES PATENT AND TRADEMARK OFFICE
CERTIFICATE OF CORRECTION

PATENT NO. : 5,752,877
DATED : May 19, 1998
INVENTOR(S) : Andy Kwan-Leung Sun

It is certified that error appears in the above-indentified patent and that said Letters Patent is hereby corrected as shown below:

Title page item [56], under References Cited, U.S. Patent Documents, "Condet et la" should be --Condet et al--.

Column 3, line 11, "450°" should be --45°--.

Column 4, Claim 1, line 7, "toy" should be --top--.

Column 6, Claim 11, line 15, after the word *support*, please delete ",".

Signed and Sealed this

Eighteenth Day of August, 1998

*Attest:*

BRUCE LEHMAN

*Attesting Officer*  *Commissioner of Patents and Trademarks*